United States Patent [19]
Schaefer

[11] 3,780,599
[45] Dec. 25, 1973

[54] PARKING BRAKE CONTROL MECHANISM
[75] Inventor: Ernest D. Schaefer, Xenia, Ohio
[73] Assignee: General Motors Corporation, Detroit, Mich.
[22] Filed: Jan. 16, 1973
[21] Appl. No.: 324,206

[52] U.S. Cl. .................................. 74/516, 74/518
[51] Int. Cl. ............................................ G05g 1/04
[58] Field of Search ...................... 74/516, 517, 518

[56] References Cited
UNITED STATES PATENTS
3,375,731   4/1968   De Lacroix .......................... 74/516

*Primary Examiner*—Milton Kaufman
*Assistant Examiner*—Frank H. McKenzie, Jr.
*Attorney*—W. S. Pettigrew et al.

[57] ABSTRACT

A vehicle parking brake apply mechanism which increases the apply force from the hand or pedal apply lever by means of a mechanical advantage which varies with the travel of the apply lever so that the mechanism initially has a low mechanical advantage which phases into a high mechanical advantage. The mechanism also changes the direction of the apply force to a plane substantially perpendicular to the original force so that it is particularly adapted for front wheel parking brake systems. The parking brake apply lever has an interlock with the transmission gear selector so that the gear selector cannot be moved into the park position until the parking brake has been applied. The interlock will not allow release of the parking brake until the transmission gear selector is moved from the park position.

2 Claims, 5 Drawing Figures

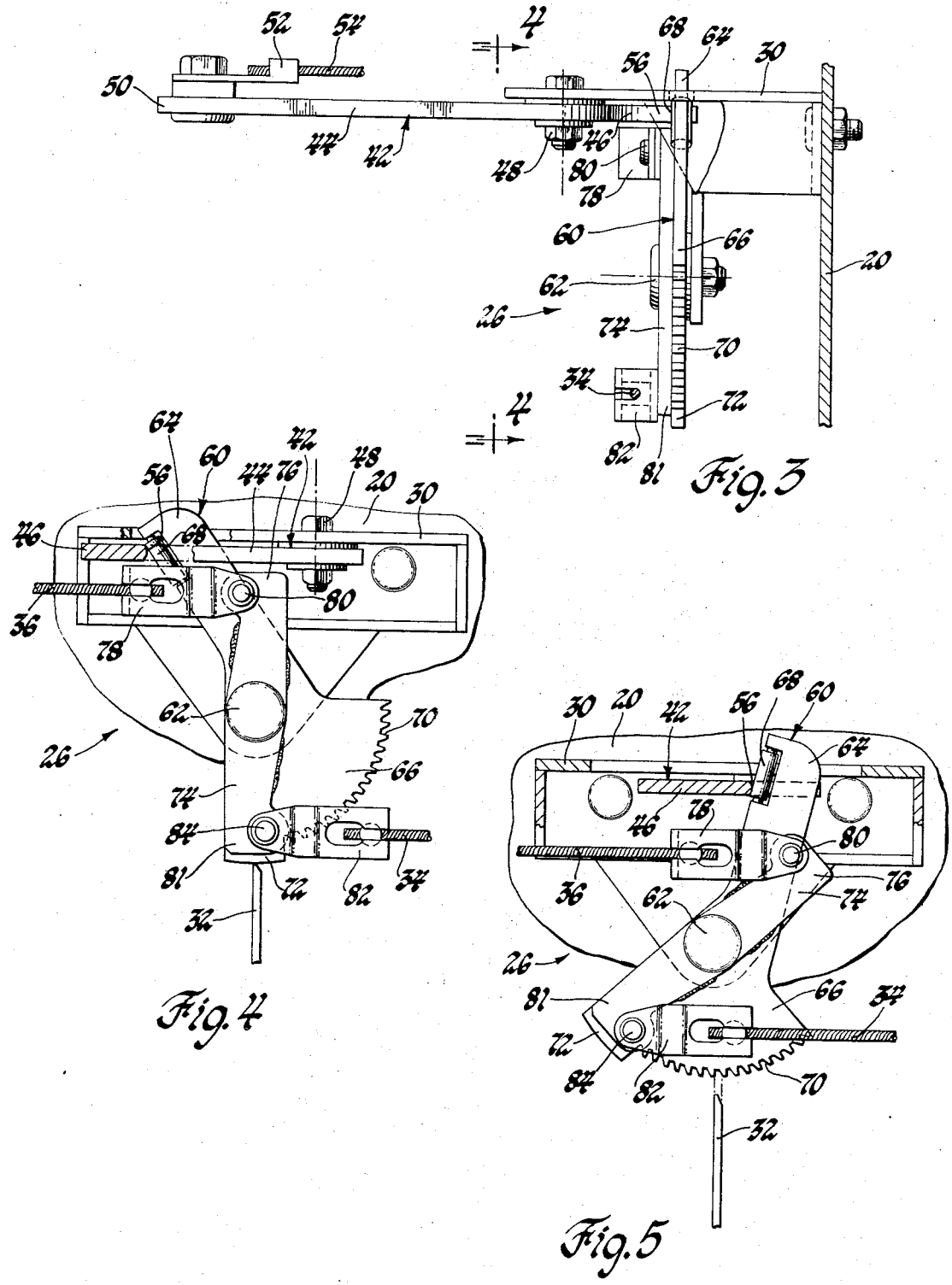

PARKING BRAKE CONTROL MECHANISM

The invention relates to a parking brake apply mechanism and more particularly to one which varies the parking brake apply force ratio from a low ratio to provide rapid take-up to a high ratio so that high output forces are obtained with small input forces near the end of the apply lever stroke. It is a feature of the invention that the apply force has a direction change of approximately 90° to the original apply force direction so that the parking brake output cable may be more readily adapted to connect with parking brakes on the front wheels of a vehicle. Another feature of the invention includes a gear selector interlock which requires the transmission gear selector to be placed in the "park" position before the parking brake can be applied, and requires removal of the transmission gear selector from the park position before the applied parking brake can be re-leased.

IN THE DRAWINGS:

FIG. 3 is an elevation view of the apply mechanism of FIG. 2, with parts broken away and in section.

FIG. 4 is an elevation view of the apply mechanism of FIGS. 2 and 3, taken in the direction of arrows 4—4 of FIG. 3 and having parts broken away and in section.

FIG. 5 is a view similar to FIG. 4 and showing the apply mechanism in the brake apply position.

Figure 1:
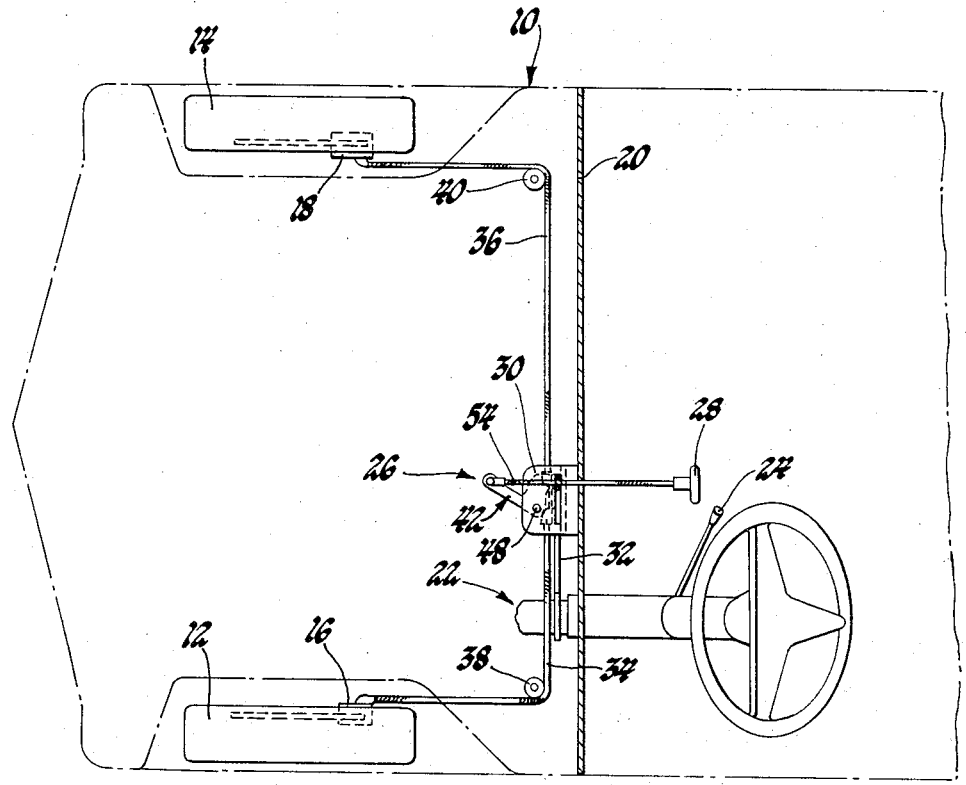
FIG. 1 is a plan view of a portion of a vehicle including a schematic representation of the vehicle front wheel brakes and the parking brake apply mechanism embodying the invention.

The vehicle 10 of FIG. 1 has the front portion thereof illustrated schematically in a plan view so that the portions of the vehicle specifically relating to the invention are shown. The vehicle has left and right front wheels 12 and 14 which are respectively equipped with brakes 16 and 18, these brakes being illustrated as disc brakes which include parking brake mechanisms. The parking brake mechanisms may be of any suitable construction subject to application by a tensioned cable. Examples of such brake mechanisms are shown in U.S. Pat. Nos. 3,653,470, issued Apr. 4, 1972; 3,670,853, issued June 20, 1972; and 3,688,875, issued Sept. 5, 1972. The vehicle has a firewall 20 separating the passenger compartment from the engine compartment. It also has a steering column assembly 22 which includes a transmission gear selector control lever 24. As is provided in the typical column mounted transmission control lever, movement of the lever in an arc about the axis of the steering column is transmitted through appropriate linkage to the vehicle transmission.

The parking brake control mechanism 26 which embodies the invention has an apply lever 28, illustrated as a hand lever extending into the passenger compartment and operated by a push-pull action, a mounting bracket 30 secured to the firewall on the opposite side thereof from the passenger compartment, various linkages arranged on the mounting bracket 30 and discussed below, a locking pawl 32 connected with the transmission shift linkage so as to be moved to and from locking and unlocking positions relative to a gear sector forming a part of the control mechanism, and left and right output cables 34 and 36 which connect with the apply mechanism linkage and the brakes 16 and 18. The cables initially extend laterally of the vehicle and pass over pulleys 38 and 40 so that they can be moved in tension with minimum friction loss to apply and release the parking brakes.

An input lever 42 is generally L-shaped so that it has an input arm 44 and an output arm 46 positioned in a plane and at an angle to each other. Lever 42 is pivotally mounted on pivot 48 at the junction of arms 44 and 46 so that it can be moved in its plane. Pivot 48 is secured to bracket 30. The outer end 50 of input arm 44 has a clevis 52 pivotally attached thereto and providing for attachment of the input cable 54. Cable 54 extends rearwardly of the vehicle and is connected to apply lever 28 so that the cable may be tensioned by the vehicle operator when apply lever 28 is pulled rearwardly. The output arm 46 of lever 42 has one side shaped to provide a cam surface 56. The cam surface is generally perpendicular to the plane of movement of input lever 42 about pivot 48 and is curved in that plane to modify the apply mechanism ratio during parking brake actuation. The cam surface outer end 58 is the farthest portion of the cam surface from the axis of pivot 48 and the cam surface is preferably curved as it approaches pivot 48.

Figure 2:
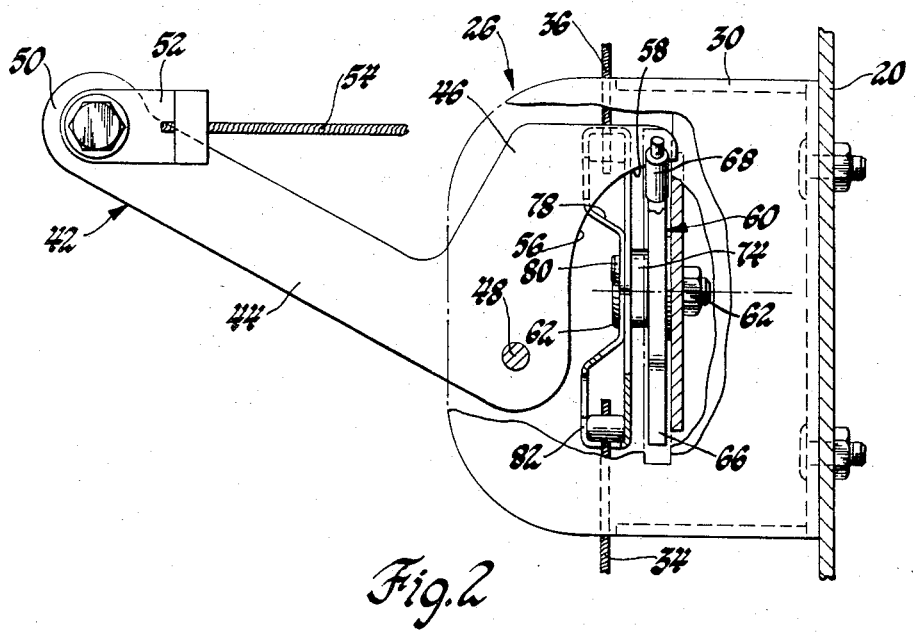
FIG. 2 is a plan view, with parts broken away and in section, of the apply mechanism embodying the invention.

A force transfer lever 60 is attached to mounting bracket 30 by pivot 62 so that the axis of pivot 62 is substantially perpendicular to the axis of pivot 48 and is skew to that axis. As can be seen in FIG. 2, the axis of pivot 62 is spaced from the axis of pivot 48 in a direction toward the cam surface outer end 58 with the input lever 42 in the release position shown. When input lever 42 is rotated about pivot 48 to the fullest extent, the cam surface 56 passes over and beyond pivot 62 as seen in FIG. 5. Force transfer lever 60 has an input arm 64 and an output arm 66 which extend in substantially opposite directions from pivot 62. One side of input arm 64 adjacent the arm's outer end has a roller mounted cam follower 68 thereon which is of sufficient length to engage cam surface 56 in all operative relative positions of levers 44 and 60. The outer end of output arm 66 is pro-vided with a ratchet teeth sector 70 which extends arcuately about pivot 62. Locking pawl 32 is aligned for engagement with two adjacent teeth of sector 70 under control of the transmission gear selector control lever 24 when the parking brake has been actuated to a certain minimum amount of rotation of force transfer lever 60. However, one end of sector 70 terminates at a tab or step 72 which extends into the line of movement of pawl 32 when the apply mechanism is in the release position. This relationship is shown in FIG. 4.

The output lever 74 is also pivoted on pivot 62 and is angularly positioned relative to force transfer lever 60 so that in the brake release position output lever 74 extends substantially parallel to the axis of pivot 48. Output lever 74 is secured to force transfer lever 60 in this relative position by suitable means such as welding. The upper end 76 of output lever 74 has a clevis 78 attached thereto by pivot 80 so that the clevis extends transversely of the vehicle 10 and in a substantially horizontal plane, the clevis having the right front cable 36 connected thereto in tension. The lower end 81 of output lever 74 has a clevis 82 attached thereto by pivot 84 so that the clevis extends transversely of vehicle 10 in a substantially horizontal plane, the left front cable 34 being secured to the clevis in tension. Pivots 80 and 84 are equally spaced from pivot 62 along a line which passes through pivots 62, 80, and 84. Therefore, the output force transmitted to output lever 74 is equally transmitted to output cables 34 and 36.

As illustrated in FIG. 4, the directions of forces transmitted through the clevises 78 and 82 are substantially parallel, in opposite directions, and initially perpendicular to output lever 74. By comparing FIG. 5 to that of FIG. 4, it can be seen that the pivotal movement of output lever 74 about pivot 62, as the apply mechanism is actuated to apply the parking brakes, results in shortening the effective arm lengths of output lever 74, thereby increasing the mechanical advantage of the apply mechanism.

When the brake apply mechanism is in the released position shown in FIGS. 1 through 4, the locking pawl 32 cannot engage any of the teeth of sector 70 since it is aligned with step 72. Cam follower 68 engages the cam surface 56 at its outer end 58. When the vehicle operator desires to apply the brakes 16 and 18 for parking purposes, he stops the vehicle and shifts the transmission gear selector control lever 24 to its park position, causing locking pawl 32 to move into engagement with step 72. The locking pawl is suitably spring loaded so that it may rest on step 72 at this time while being urged against the step. The operator then pulls lever 28 rearwardly, which rotates input lever clockwise about pivot 48, as viewed in FIGS. 1 and 2. This causes cam surface 56 to move cam follower 68 and therefore force transfer lever 60 clockwise as viewed in FIGS. 4 and 5. The contour of cam surface 56 is such that there is an initial relatively low mechanical advantage between the effective length of input arm 44 and the effective length of output arm 46. However, as lever 42 rotates in the apply direction, cam follower 68 moves closer to the axis of pivot 48, thereby in-creasing the mechanical advantage as the apply mechanism is actuated. The movement of cam follower 68 causes movement of force transfer lever 60 from the position shown in FIG. 4 toward the position shown in FIG. 5. Since output lever 74 is secured to force transfer lever 60, it pivots with the force transfer lever about pivot 62 from the position shown in FIG. 4 toward the position shown in FIG. 5. Step 72 rotates out of engagement with locking pawl 32 and the locking pawl then engages sector 70. The ratchet teeth of sector 70 and the toothed end of pawl 32 are constructed to permit continued clockwise rotation of force transfer lever 60 while preventing any counterclockwise rotation thereof. When the brake has been applied to the desired extent, the vehicle operator releases lever 28 and locking pawl 32 prevents re-lease of the mechanism.

The transmission control lever 24 must be moved out of the park position to remove the locking pawl 32 from engagement with sector 70. When the pawl is so disengaged, the apply mechanism is released and the tension in cables 34 and 36 return the mechanism to the position shown in FIGS. 1 through 4.

The apply mechanism may also be used to actuate brakes 16 and 18 without locking the mechanism in a brake applied position by leaving the transmission control lever in some position other than park. Therefore, locking pawl 32 cannot engage sector 70. In this type of operation the vehicle front wheels will be braked only so long as lever 28 is pulled rearwardly to transmit sufficient tension force through the mechanism to actuate the brakes. Once the force on lever 28 is relaxed, the mechanism returns toward the brake release position. This arrangement therefore provides a backup vehicle brake arrangement which is mechanical rather than hydraulic.

By providing a fore and aft push-pull application and release through lever 28 which is translated to lateral directions of movement of cables 34 and 36, the cables may be readily connected to the front wheel brakes. This results in a shorter cable routing than that required for rear parking brakes and permits the installation of parking brakes on the vehicle wheels which normally require the greater braking action.

What is claimed is:

1. A variable ratio parking brake control mechanism comprising:

a fixed bracket having a generally planer input first lever and a generally planer force transfer second lever pivotally attached thereto with said levers being arcuately movable in planes at substantially right angles to each other;

said first lever having a first input arm and a first output arm with its lever pivot axis being therebetween, and means for pivoting said first lever about its pivot axis in its plane and in a direction to apply a parking brake;

said first output arm having one edge shaped to provide a cam surface extending along a length thereof; said second lever having a second input arm and a second output arm with its lever pivot axis being therebetween; said second input arm intersecting the plane of said first lever and having a cam follower thereon engaging said cam surface in camming relation; said second output arm having a ratchet tooth sector formed thereon;

a locking pawl positioned to selectively engage and disengage said ratchet tooth sector to lock said second lever against pivotal movement in the brake release direction and to release said second lever;

a third lever secured to said second lever for pivotal movement therewith and having first and second pivotally movable output connections pivotally attached thereto on opposite sides of the second lever pivot axis and extending substantially at right angles to said third lever when the mechanism is in the brake released condition and acting in parallel in opposite directions when said second lever is pivotally moved by said first lever acting through said cam surface and said cam follower to increase the effective mechanical advantage between said second lever cam follower and said output connections;

said cam surface being contoured to increase the effective mechanical advantage of said first lever as said first lever is pivotally moved from the brake released position in the brake applying direction.

2. A parking brake control mechanism comprising:

a mounting bracket;

an input lever pivoted on said bracket and having a cam surface on one arm thereof, a force transfer lever pivoted on said bracket and having a cam follower on one end thereof engaging said cam surface in driven relation and having a ratchet tooth sector on the other end thereof, an output lever pivoted on said bracket and pivotally driven by said force transfer lever and having on opposite ends thereof pivotal connecting means for transmitting brake apply forces from said control mechanism to brake assemblies, and means for selectively locking said ratchet tooth sector against movement of said force transfer lever in the brake release direction and to release said ratchet tooth sector, said cam surface being contoured to increase the mechanical advantage of said input lever in at least the portion of the pivotal movement of said input lever corresponding to the latter part of the brake apply movement, said force transfer lever being positioned in the brake release position so that as brake apply movement occurs the effective lever length of said cam follower decreases during the first part of such movement and then increases in the latter part of such movement to sequentially increase and then decrease the mechanical advantage thereof, the increased mechanical advantage afforded by said cam surface during the latter part of the brake apply movement being greater than the decreased mechanical advantage of the force transfer lever during such movement.

* * * * *